United States Patent
Saulnier et al.

(10) Patent No.: US 12,503,365 B2
(45) Date of Patent: Dec. 23, 2025

(54) SYSTEM FOR PURIFYING ARGON BY CRYOGENIC DISTILLATION

(71) Applicant: L'Air Liquide, Societe Anonyme pour l'Etude et l'Exploitation des Procedes Georges Claude, Paris (FR)

(72) Inventors: Bernard Saulnier, Jouy-en-Josas (FR); Antonio Trueba, Jouy-en-Josas (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 619 days.

(21) Appl. No.: 17/825,032

(22) Filed: May 26, 2022

(65) Prior Publication Data
US 2022/0380215 A1    Dec. 1, 2022

(30) Foreign Application Priority Data
May 27, 2021 (FR) .................. FR 2105494

(51) Int. Cl.
 C01B 23/00    (2006.01)
 F25J 3/04     (2006.01)

(52) U.S. Cl.
 CPC ......... *C01B 23/0089* (2013.01); *F25J 3/0409* (2013.01); *F25J 3/04096* (2013.01); *F25J 3/04412* (2013.01); *F25J 2250/40* (2013.01)

(58) Field of Classification Search
 CPC .. F25J 3/04872; F25J 3/04412; F25J 3/04096; F25J 3/04836; F25J 3/04812;
 (Continued)

(56) References Cited

U.S. PATENT DOCUMENTS

| | | |
|---|---|---|
| 5,132,055 A | 7/1992 | Alleaume et al. |
| 5,237,823 A | 8/1993 | Cheung et al. |
| | (Continued) | |

FOREIGN PATENT DOCUMENTS

| | | |
|---|---|---|
| EP | 1 016 457 | 7/2000 |
| FR | 2 655 877 | 6/1991 |
| | (Continued) | |

OTHER PUBLICATIONS

French Search Report for FR 2 105 494, mailed Feb. 17, 2022.
(Continued)

*Primary Examiner* — Frantz F Jules
*Assistant Examiner* — Webeshet Mengesha
(74) *Attorney, Agent, or Firm* — Justin K. Murray

(57) ABSTRACT

System for purifying argon by cryogenic distillation, comprising a single column surmounted by a top-end condenser, a fluid inlet in the lower part of the column, a fluid outlet in the upper part of the column, and N distillation sections where N≥4, of which at least the two uppermost sections of the column are equipped respectively with a first liquid distributor and with a second liquid distributor, the second distributor being capable of performing a function of mixing together liquids that fall onto the distributor, each of the first and second distributors being positioned above the respective section and of which the two lowermost sections of the column are respectively equipped with a (N−1)th and an Nth liquid distributor capable of performing a function of mixing together liquids that fall onto the distributor, and which is arranged above the respective section, the first, second, (N−1)th and Nth distributors each being dimensioned to contain a maximum height of liquid head, that (those) of the first and second distributors being greater than that (those) of the (N−1)th and Nth distributors.

8 Claims, 2 Drawing Sheets

(58) Field of Classification Search
CPC .... F25J 3/04927; F25J 3/04703; B01D 3/143; B01D 3/16; B01D 3/32
See application file for complete search history.

(56) References Cited

U.S. PATENT DOCUMENTS

| | | | |
|---|---|---|---|
| 5,785,900 | A | 7/1998 | Belot et al. |
| RE36,577 | E * | 2/2000 | Jeannot ................ F25J 3/04412 196/139 |
| 6,149,136 | A * | 11/2000 | Armstrong ............. B01D 3/008 261/106 |
| 7,527,249 | B2 | 5/2009 | Dubettier-Grenier et al. |
| 10,473,392 | B2 | 11/2019 | Cavagne et al. |
| 2018/0304192 | A1 | 10/2018 | Perdu et al. |
| 2020/0041204 | A1 | 2/2020 | Briglia et al. |
| 2020/0155960 | A1* | 5/2020 | Duparc ................ B01D 53/185 |

FOREIGN PATENT DOCUMENTS

| | | | |
|---|---|---|---|
| FR | 2 732 616 | 10/1996 | |
| FR | 2 860 990 | 4/2005 | |
| FR | 2 951 532 | 4/2011 | |
| FR | 3 077 505 | 8/2019 | |
| FR | 3 084 736 | 2/2020 | |
| JP | 2000249464 A * | 9/2000 | ............... B01D 3/20 |
| WO | WO 2015/121593 | 8/2015 | |

OTHER PUBLICATIONS

Harrison, et al., "Distillation Column Troubleshooting," Chemical Engineering, Access Intelligence Association, Rockville, MA, US, vol. 96, No. 4, Apr. 1, 1989, pp. 121-128.

* cited by examiner

[Fig.1]
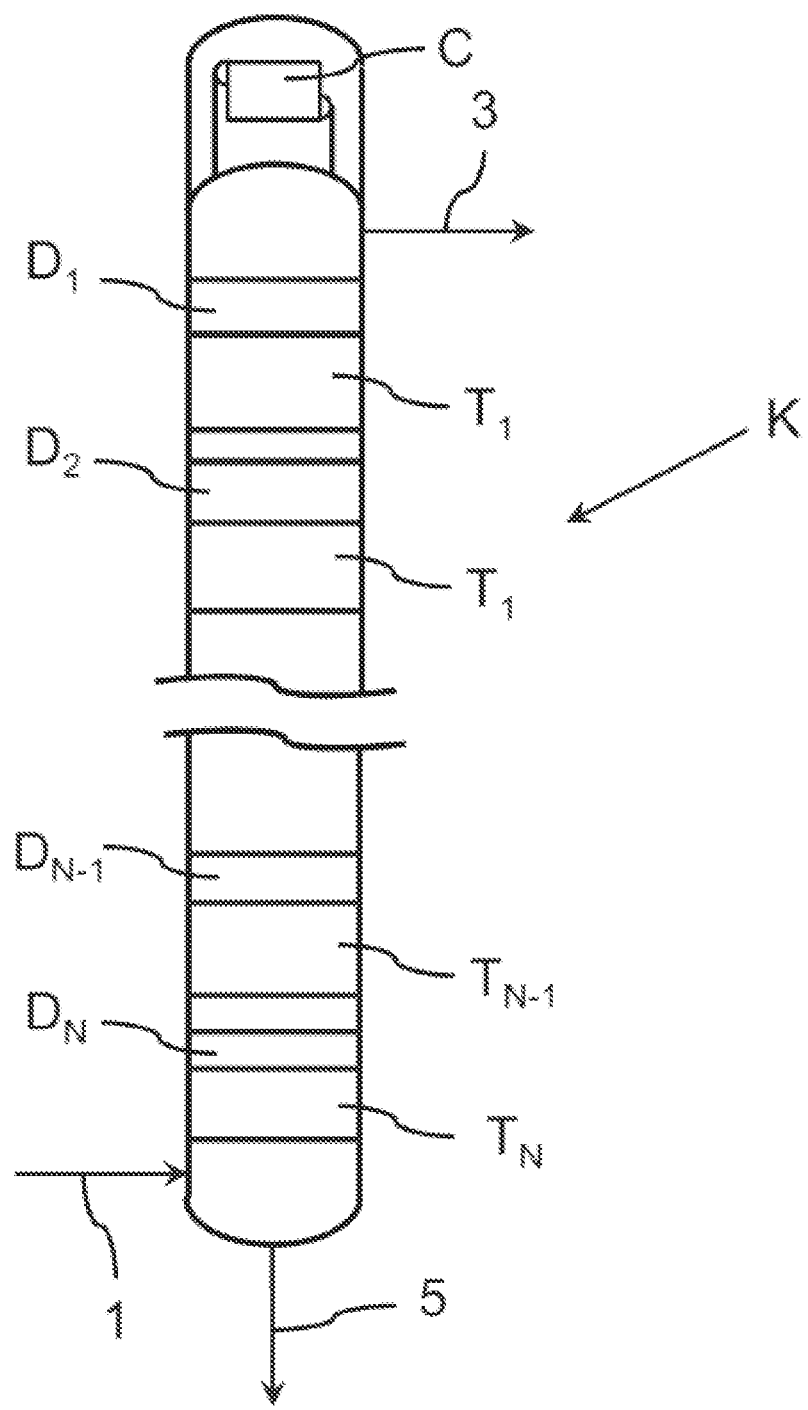

[Fig.2]
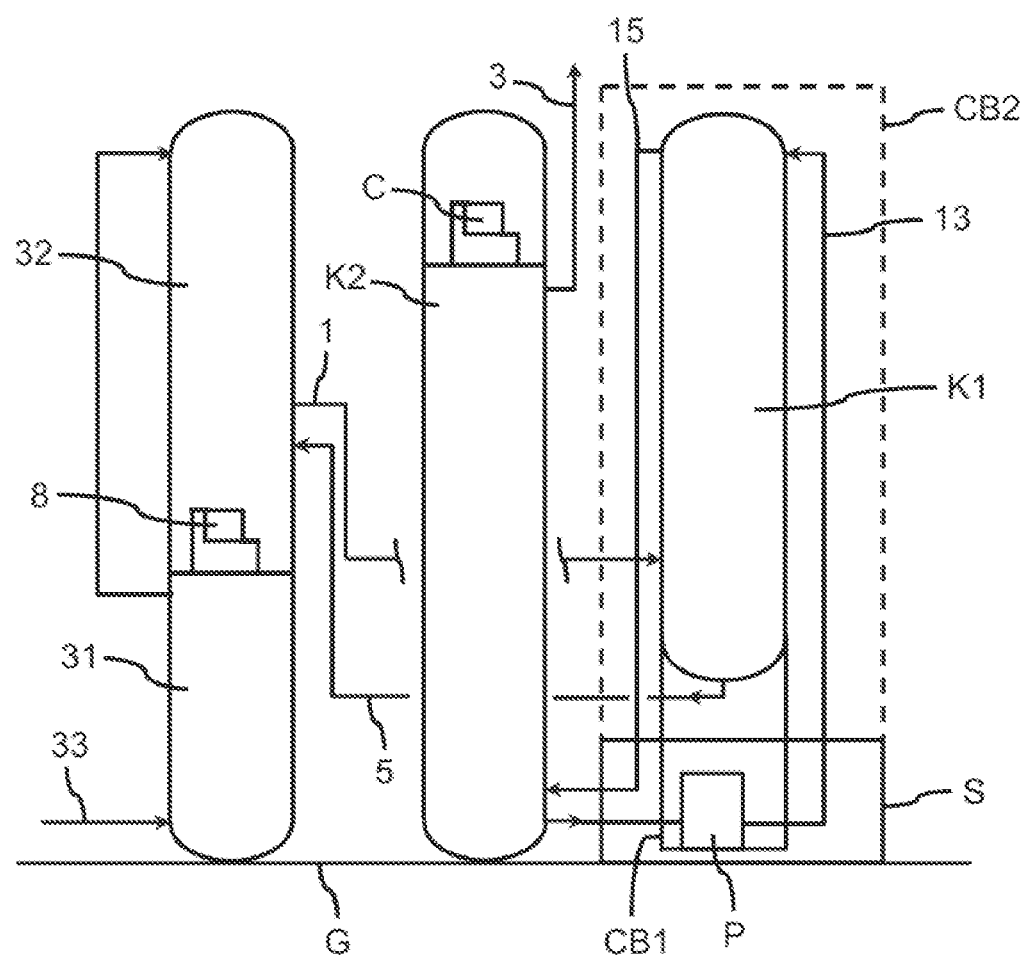

SYSTEM FOR PURIFYING ARGON BY CRYOGENIC DISTILLATION

CROSS REFERENCE TO RELATED APPLICATIONS

This application claims the benefit of priority under 35 U.S.C. § 119 (a) and (b) to French patent application No, FR2105494, filed May 27, 2021, the entire contents of which are incorporated herein by reference.

FIELD OF THE INVENTION

The present invention relates to a system for purifying argon by cryogenic distillation and to a cryogenic distillation air separation unit comprising such a system.

BACKGROUND OF THE INVENTION

The use of renewable energies, the continuous availability of which cannot be assured, increases the benefit offered by cryogenic distillation air separation units the energy consumption of which can be partially reduced to a very significant extent.

The minimum load for conventional cryogenic distillation air separation units is essentially limited by the compressors and by the distillation columns. In the case of the latter, the state of the art for this load is of the order of 50% of nominal load, which is sufficient for units equipped with a single air compressor, the conventional minimum load of which represents rather 60-70% of nominal load.

However, where energy transition may make installing 2 to 3 air compressors in parallel an attractive proposition, the minimum load required for the distillation columns may reach 25-30% of nominal load.

SUMMARY OF THE INVENTION

In certain embodiment of the invention, the object of the invention is to lower the minimum load for an argon purification system of a cryogenic distillation air separation unit without significant loss in efficiency. Complete purification of argon via a cryogenic route is actually very tricky because it requires more than 150 theoretical plates. It is considered to be particularly important to ensure that perfect surface-distribution of the liquid is maintained along the entire length of the column.

It is conceivable to split this column into 4 to 8 sections, each fed by a high-performance distributor. What is meant by a high-performance distributor is a distributor that ensures a surface-distribution of the flow rate that is consistent to within 2% across all the various zones of the column, these zones having a characteristic dimension of the order of magnitude of the height of one packing element when the load on the column is at the minimum for which it was designed and the deviations from the theoretical geometry are at the maximum of the manufacturing tolerances.

An example of a simple eight-section column is described in FR-A-3084736.

Routine practice, where it is desired to lower the minimum load for the column, is to increase the flexibility of each distributor in order to maintain distribution of high quality when the load decreases. For example, if the distributors are made up of troughs perforated with holes, the perforated cross section is reduced so that the height of liquid head at reduced load remains significantly higher (typically 20 to 50 times higher) than the maximum differences in level between holes, which results from the construction. As a consequence, the height of the distributor needs to be increased in order to be able to contain the height of liquid head that will establish itself at full load. Indeed, for a real-life distributor, certain holes are higher than others, because of imperfections in the manufacture of the distributors, their installation in the column, or else as a result of defective verticality of the column. Thus, differences may arise and lead to a difference in the height of liquid head above the holes, and therefore to differences in flow rate.

Certain embodiments of the invention hinge on the observation that the effect of significant deficiencies in distribution can be almost completely compensated for by a mixing, even a partial mixing, of the liquids coming from two zones of the column having different reflux ratios and therefore different compositions. The more significant the differences in composition, in terms of absolute value, the greater will be the compensating effect of mixing them.

Therefore, installing mixing distributors in the lower zones of the argon purification column, where the oxygen contents, and therefore the differences (in absolute value) caused by potential distribution deficiencies, are still notable, is highly effective at correcting the effect of distribution deficiencies. By contrast, in the upper part of the argon purification column, numerous mixing distributors would need to be installed in order to achieve a comparable effect.

Certain embodiments of the invention therefore consist in installing distributors that provide high-quality distribution in the upper part of the argon purification column, whereas the rest of the column can be equipped with mixing distributors that are more rudimentary as regards the distribution of liquid, for example having a shorter height or, in any event, that allow the total cost of the column to be reduced, for example because the distributors are simpler.

The distributor of which the distribution quality plays the most essential role in the unit is the one just below the condenser, right at the very top of the column, because this is the one that distributes the purest liquid.

It is known practice to purify argon in a single column or in two columns connected in series. Certain embodiments of the invention apply to both possibilities.

According to one subject of the invention, there is provided a system for purifying argon by cryogenic distillation, comprising:

i) A single column surmounted by a top-end condenser, a fluid inlet in the lower part of the column, a fluid outlet in the upper part of the column, and N distillation sections where N≥4, each section being made up of a stack of units of structured packing, of the cross-corrugated type, each unit comprising a packet of rectangular corrugated sheets, of which at least the two uppermost sections of the column are equipped respectively with a first liquid distributor and with a second liquid distributor, the second distributor being capable of performing a function of mixing together liquids that fall onto the distributor, each of the first and second distributors being positioned above the respective section and of which at least two lowermost sections of the column are respectively equipped with a (N−1)th and an Nth liquid distributor capable of performing a function of mixing together liquids that fall onto the distributor, and which is arranged above the respective section, or ii) A first column and a second column surmounted by a top-end condenser, a fluid inlet in the lower part of the first column, a fluid outlet in the upper part of the second column, means connecting the top end of the first column and the bottom end of the second column to allow a bottom liquid from the second column to be conveyed to the top end of the first column and allow a top-end gas from the first column to be conveyed to the second column, the first and second columns comprising in total N distillation sections where N≥4, each section being made up of a stack of units of structured packing, of the cross-corrugated type, each unit comprising a packet of rectangular corrugated sheets, of which at least the two uppermost sections of the second column are equipped respectively with a first liquid distributor and with a second liquid distributor capable of performing a function of mixing together liquids that fall onto the distributor, each of the first and second distributors being positioned above the respective section and of which at least two lowermost sections of the first column are respectively equipped with a (N−1)th and an Nth liquid distributor capable of performing a function of mixing together liquids that fall onto the distributor, and which is arranged above the respective section, wherein the first, second, (N−1)th and Nth distributors are each dimensioned to contain a maximum height of liquid head, that (those) of the first and second distributors being greater than that (those) of the (N−1)th and Nth distributors.

Thus, the maximum height or heights of liquid head for which the first and second distributors are dimensioned is/are greater than that (those) for which the (N−1)th and Nth distributors are dimensioned.

The first and second distributors are not necessarily dimensioned for the same maximum height of liquid head.

The (N−1)th and Nth distributors are not necessarily dimensioned for the same maximum height of liquid head.

According to other, optional aspects:

the system comprises a single column comprising N sections where N≥8, each section being made up of a stack of units of structured packing, of the cross-corrugated type, each unit comprising a packet of rectangular corrugated sheets, of which at least the three uppermost sections of the column are equipped respectively with a first liquid distributor, with a second liquid distributor capable of performing a function of mixing together liquids that fall onto the distributor, and with a third liquid distributor capable of performing a function of mixing together liquids that fall onto the distributor, each of the first, second and third distributors being arranged above the respective section, and at least the five lowermost sections of the column being respectively equipped with a liquid distributor capable of performing a function of mixing together liquids that fall onto the distributor, and which is arranged above the respective section, the first, second, third, (N−4)th, (N−3)th, (N−2)th, (N−1)th and Nth distributors are each dimensioned to contain a maximum height of liquid head, that (those) of the first, second and third distributors being greater than that (those) of the (N−4)th, (N−3)th, (N−2)th, (N−1)th and Nth distributors.

the (N−1)th and Nth distributors are dimensioned to contain a maximum height of liquid head, which is at least 30% less than that (those) for which the first and second distributors are dimensioned.

the (N−1)th and Nth distributors are dimensioned to contain a maximum height of liquid head greater than 50 mm.

the first and second and, where applicable, third, distributors are dimensioned for a maximum height of liquid head, which is between 150 and 300 mm.

the system comprises a single column comprising N sections where N≥8, each section being made up of a stack of units of structured packing, of the cross-corrugated type, each unit comprising a packet of rectangular corrugated sheets, of which at least the three uppermost sections of the column are equipped respectively with a first liquid distributor, with a second liquid distributor capable of performing a function of mixing together liquids that fall onto the distributor, and with a third liquid distributor capable of performing a function of mixing together liquids that fall onto the distributor, each of the first, second and third distributors being arranged above the respective section, and at least the five lowermost sections of the column being respectively equipped with a liquid distributor capable of performing a function of mixing together liquids that fall onto the distributor, and which is arranged above the respective section, the first, second and third, distributors each comprising at least two rows of perforations intended for distributing the liquid, one row being arranged above the other, and the (N−4)th, (N−3)th, (N−2)th, (N−1)th and Nth distributors comprise a single row of perforations intended for distributing liquid.

Another subject of the invention relates to an air separation unit comprising a column suited to operating at a first pressure and the column suited to operating at a second pressure, the second pressure being lower than the first pressure, the top end of the column suited to operating at the first pressure being thermally connected to the bottom end of the column suited to operating at a second pressure, a pipe for sending purified air to the column suited to operating at the first pressure, a pipe for sending an oxygen-enriched liquid from the column suited to operating at the first pressure to the column suited to operating at the second pressure, a pipe for sending a nitrogen-enriched liquid from the column suited to operating at the first pressure to the column suited to operating at the second pressure, a pipe for withdrawing an oxygen-enriched liquid from the column suited to operating at a second pressure, a pipe for withdrawing a nitrogen-enriched fluid from the column suited to operating at a second pressure, and a pipe connected to an intermediate point on the column suited to operating at a second pressure so as to withdraw an argon-enriched fluid, this pipe being connected to a purification system as described hereinabove.

The unit preferably comprises at least two compressors, or even at least three compressors, connected in parallel to the pipe for sending purified air to the column suited to operating at the first pressure.

Another subject of the invention relates to a distillation method using a purification system as described hereinabove, wherein a flow containing argon and oxygen is sent to the purification system where it is separated to form an oxygen-enriched liquid and an argon-enriched fluid which contains at most 100 ppm of oxygen.

BRIEF DESCRIPTION OF THE DRAWINGS

The invention will be understood better from reading the following description and from studying the accompanying figures. These figures are given only by way of illustration and do not in any way limit the invention.

FIG. 1 illustrates an argon purification column according to the invention.

FIG. 2 illustrates a separation unit comprising an argon purification column according to the invention.

DETAILED DESCRIPTION OF THE INVENTION

FIG. 1 illustrates the system of columns comprising a single distillation column K.

The distillation column K surmounted by a condenser C contains N distillation sections $T_1, T_2 \ldots T_{N-1}, T_N$, each section being made up of a stack of units of structured packing, of the cross-corrugated type, each unit comprising a packet of rectangular corrugated sheets. Each section $T_1, T_2 \ldots T_{N-1}, T_N$, receives liquid from a distributor just above the section, and there are therefore N distributors, one for each section. The column may comprise 150 theoretical plates and the number N of sections is at least equal to 4, for example at least 8 sections.

FIG. 1 shows that the two sections $T_1, T_2$ closest to the condenser C are each equipped with a liquid distributor $D_1$, $D_2$, $D_2$ being capable of performing a function of mixing together liquids that fall from the section $T_1$ immediately above the distributor Dz.

The section $T_1$ closest to the condenser C is equipped with a liquid distributor $D_1$ which receives liquid condensed in the condenser C and distributes it preferably over the entire horizontal cross section of section $T_1$.

At the bottom of the column are the two lowermost sections $T_{N-1}, T_N$ and the associated distributors $D_{N-1}, D_N$, the distributor $D_{N-1}$ receiving the liquids from the N-2th section and sending the mixed liquids to the section $T_{N-1}$ and the distributor $D_N$ receiving liquids from the N-1th section and mixing them to send them to the last section, therefore the Nth section.

The sections from the third to the N-2$^{th}$ and their distributors are not illustrated.

The liquid-distribution quality achieved by the distributors at the top of the column is better than that of the distributors at the bottom of the column.

One possibility is for the first, second, (N-1)th and Nth distributors each to be dimensioned to contain a maximum height of liquid head, the maximum height of liquid head of the first and second distributors being greater than that (those) of the (N-1)th and Nth distributors. If the quantity of liquid sent to a distributor fills it above a maximum height of liquid head, the distributor overspills and the surplus quantity of liquid is not held by the distributor.

The first and second distributors may have the same maximum height of liquid head and different maximum heights.

The (N-1)th and Nth distributors may have the same maximum height of liquid head and different maximum heights.

Another possibility, which is compatible with the first, is for the first and second distributors each to comprise at least two rows of perforations intended for distributing the liquid, one row being arranged above the other, and for the (N-1)th and Nth distributors to comprise a single row of perforations intended for distributing liquid.

In instances in which N is equal to at least eight, the first, second, third, (N-4)th, (N-3)th, (N-2)th, (N-1)th and Nth distributors are each dimensioned to contain a maximum height of liquid head, that (those) of the first, second and third distributors being greater than that (those) of the (N-4)th, (N-3)th, (N-2)th, (N-1)th and Nth distributors.

Another alternative is for the first, second and third distributors each to comprise at least two rows of perforations intended for distributing the liquid, one row being arranged above the other, and for the (N-4)th, (N-3)th, (N-2)th, (N-1)th and Nth distributors each to comprise a single row of perforations intended for distributing the liquid.

In one example, the (N-1)th and Nth distributors are dimensioned to contain a maximum height of liquid head, which is at least 30% less than that (those) for which the first and second distributors are dimensioned.

Otherwise, the (N-4)th, (N-3)th, (N-2)th, (N-1)th and Nth distributors are dimensioned to contain a maximum height of liquid head, which is at least 30% less than that (those) for which the first, second and third distributors are dimensioned.

To ensure good operation, the (N-1)th and Nth distributors, or even the (N-4)th, (N-3)th, (N-2)th, (N-1)th and Nth distributors, are dimensioned for a maximum height of liquid head greater than 50 mm.

As a preference, the first and second and, where applicable, third, distributors are dimensioned for a maximum height of liquid head, which is between 150 and 300 mm.

In the event of reduced operation, the flow rate of the flow 1 sent to the column K containing at least the first and second distributors corresponds to between 25 and 45% of the nominal load for the column. In that case, at least the first distributor ensures a difference in flow rate of less than 1% between various zones of the horizontal cross section of the section that it supplies, thanks to its improved structure.

In contrast, the distributors at the bottom of the column are able to have poorer performance, for example at least one distributor above one of the lower sections provides a difference in flow rate of more than 1% between various zones of the horizontal cross section of the section that it supplies.

As a preference, all the distributors from the second to the N-1th mix together the liquids that they receive along at least one axis, sending at least 20% of a flow of falling onto one zone of their horizontal cross section to a zone diametrically opposite that zone.

As a preference, the argon-enriched fluid 3 contains at most 100 ppm of oxygen.

At least three lower sections 3, 4, 5 are each equipped with a liquid distributor $D_3, D_4, D_5$, capable of performing a function of mixing together liquids that fall onto the distributor, which is arranged above the section and has a distribution-quality index below a second threshold lower than the first threshold.

Each distributor $D_1, D_2, D_{N-2}, D_{N-1}, D_N$ is preferably of the type described in FR3077505, FR2655877, FR2860990 or FR2732616. The distributor may for example comprise profiled elements in the shape of an inverted U, with substantially vertical walls and a bottom in which a plurality of parallel slots are formed, each slot being covered by one of the profiled elements, which are fixed to the bottom by means of the walls in a permanent and fluidtight manner. Fins are attached to the side of the profiled elements to form lateral openings. The bottom may have perforations.

Nevertheless, other types of distributor may be used.

A flow 1 containing argon and oxygen is sent to the bottom of the column K where it separates to form an argon-rich flow 3 containing at most 100 ppm of oxygen at the top of the column and an oxygen-enriched flow 5 at the bottom of the column.

The column K is intended to form part of an air separation unit comprising a first distillation column K1 operating at a first pressure and a second distillation column K2 operating at a second pressure, the second pressure being lower than the first pressure. The top of the first column is thermally connected to the bottom of the second column, Purified air 11 is sent to the first column K1, an oxygen-enriched liquid from the first column to the second column, and a nitrogen-enriched liquid is sent from the first column to the second column. An oxygen-enriched fluid is withdrawn from the bottom of the second column, and a nitrogen-enriched fluid is withdrawn from the top of the second column. A pipe 1 connected to an intermediate point on the second column K2 withdraws an argon-enriched fluid from the second column, this pipe being connected to the column K.

The nominal load for the column K is the usual flow rate 1 that it processes during normal operation. This flow rate may drop. If, for example, the flow of air 11 is compressed by two compressors in parallel, the flow rate of the flow 17 may be reduced by half, or even two-thirds. If the flow 11 comes from three compressors in parallel, the flow rate of the flow 17 may be reduced by two-thirds, or even by three-quarters.

FIG. 2 illustrates the air separation unit comprising two distillation columns K1, K2, the column K1 corresponding to the lower part of the column K of [FIG. 1] and the column K2 corresponding to the upper part, and therefore comprising the condenser C. The N sections are distributed between the two columns K1, K2, at least the sections $T_1$ and $T_2$ being in the column K2 just below the condenser, and at least the sections $T_{N-1}$, $T_N$ being the lowermost sections at the bottom of the column K1.

Each section has an associated distributor as in [FIG. 1]; the column K1 is supplied from the bottom by the argon-enriched flow 1 and produces the oxygen-enriched liquid 5. The top-end gas 15 of column K1 is sent to the bottom of column K2 and the bottom liquid 12 from column K2 is sent to the top of column K1 by a pump P, the possibility of withdrawing an intermediate liquid or gas not being excluded. The gas 15 separates in column K2 and becomes richer in argon as it ascends in column K2 to form, at the top, after passing through sections $T_1$ and $T_2$, a product 3 that is rich in argon.

The type of distributor is chosen in the same way as for [FIG. 1] so that the distributors at the very top of column K2 distribute better than the distributors at the very bottom of column K1.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

We claim:

1. A system configured to purify argon by cryogenic distillation, the system comprising:
   i. a single column surmounted by a top-end condenser, a fluid inlet in a lower part of the column, a fluid outlet in an upper part of the column, and N distillation sections where N≥4, each section being made up of a stack of units of structured packing, of a cross-corrugated type, each of said units of structured packing comprising a packet of rectangular corrugated sheets, of which at least the two uppermost sections of said N distillation sections of said single column are equipped respectively with a first liquid distributor and with a second liquid distributor, the second liquid distributor being configured to perform a function of mixing together liquids that fall onto the second liquid distributor, each of the first and second liquid distributors being positioned above a respective section among said two uppermost sections and of which at least two lowermost sections of the column are respectively equipped with a (N−1) th and an Nth liquid distributor configured to perform a function of mixing together liquids that fall onto the (N−1) th liquid distributor and the Nth liquid distributor, and which is arranged above the respective section; or
   ii. a first column and a second column surmounted by a top-end condenser, a fluid inlet in a lower part of the first column, a fluid outlet in an upper part of the second column, means for connecting a top end of the first column and a bottom end of the second column to allow a bottom liquid from the second column to be conveyed to the top end of the first column and allow a top-end gas from the first column to be conveyed to the second column, the first and second columns comprising in total N distillation sections where N≥4, each section being made up of a stack of units of structured packing, of a cross-corrugated type, each of said stack of units of structured packing comprising a packet of rectangular corrugated sheets, of which at least a two uppermost sections of the second column are equipped respectively with a first liquid distributor and with a second liquid distributor configured to perform a function of mixing together liquids that fall onto the first liquid distributor of the second liquid distributor respectively, each of the first and second liquid distributors being positioned above a respective section and of which at least two lowermost sections of the first column are respectively equipped with a (N−1)th and an Nth liquid distributor configured to perform a function of mixing together liquids that fall onto the (N−1)th liquid distributor and the Nth liquid distributor, and which is arranged above the respective section, wherein the first, second, (N−1)th and Nth liquid distributors are each dimensioned to contain a maximum height of liquid head, wherein the maximum height of liquid head for which the first and second liquid distributors are dimensioned is greater than the maximum height of liquid head for which the (N−1)th and Nth liquid distributors are dimensioned.

2. The system according to claim 1, comprising the single column comprising the N distillation sections where N≥8, each distillation section being made up of the stack of units of structured packing, of the cross-corrugated type, each stack of units of structured packing comprising a packet of rectangular corrugated sheets, of which at least a three uppermost sections of said N distillation sections of the single column are equipped respectively with a first liquid distributor and with a second liquid distributor configured to perform a function of mixing together liquids that fall onto the first liquid distributor or the second liquid distributor, respectively, and with a third liquid distributor configured to perform a function of mixing together liquids that fall onto the third liquid distributor, each of the first, second and third distributors being arranged above the respective distillation section; and at least a five lowermost sections of said N distillation sections of the single column being respectively equipped with a liquid distributor configured to perform a function of mixing together liquids that fall onto the respective liquid distributor, and which is arranged above the respective distillation section, wherein the first, second, third, (N−4)th, (N−3)th, (N−2)th, (N−1)th and Nth liquid distributors are each dimensioned to contain a maximum height of liquid head, wherein the maximum height of liquid head of the first, second and third liquid distributors are dimensioned is greater than the maximum height of liquid head of the (N−4)th, (N−3)th, (N−2)th, (N−1)th and Nth liquid distributors are dimensioned.

3. The system according to claim 1, wherein the (N−1) th and Nth liquid distributors are dimensioned to contain the maximum height of liquid head that is at least 30% less than the maximum height of liquid head for which the first and second liquid distributors are dimensioned.

4. The system according to claim 1, wherein the maximum height of liquid head of the (N−1)th and Nth liquid distributors is greater than 50 mm.

5. The system according to claim 1, wherein the maximum height of liquid head of the first and second liquid distributors is between 150 and 300 mm.

6. The system according to claim 1, comprising the single column comprising the N distillation sections where N≥8, each distillation section being made up of a stack of units of structured packing, of the cross-corrugated type, each of said stack of units of structured packing comprising a packet of rectangular corrugated sheets, of which at least a three uppermost sections of said N distillation section of the single column are equipped respectively with a first liquid distributor, with a second liquid distributor configured to perform a function of mixing together liquids that fall onto the first or second liquid distributor, and with a third liquid distributor configured to perform a function of mixing together liquids that fall onto the third liquid distributor, each of the first, second and third liquid distributors being arranged above the respective distillation section, and at least a five lowermost sections of said N distillation section of the single column being respectively equipped with a liquid distributor configured to perform a function of mixing together liquids that fall onto the respective liquid distributor, and which is arranged above the respective distillation section, the first, second and third, liquid distributors each comprising at least two rows of perforations configured to distribute liquid, one row being arranged above the other, and the (N−4)th, (N−3)th, (N−2)th, (N−1) th and Nth liquid distributors comprising a single row of perforations configured to distribute liquid.

7. The system according to claim 1, wherein the first liquid distributor is configured to ensure a difference in liquid flow rate of less than 1% across various zones of a horizontal cross-section of the distillation section supplied by said first liquid distributor when a flow rate of a fluid entering the fluid inlet of the single column or the first column is between 25% and 45% of a nominal operation load for the single column or the first column.

8. The system according to claim 1, wherein each of the liquid distributors from the second liquid distributor to the (N−1) th liquid distributor, inclusive, is configured to mix liquids received thereon by directing at least 20% of a liquid flow falling onto one zone of said liquid distributor's horizontal cross-section to a zone diametrically opposite said one zone along at least one axis of said liquid distributor.

* * * * *